(12) United States Patent
Johnson et al.

(10) Patent No.: US 10,491,132 B2
(45) Date of Patent: Nov. 26, 2019

(54) DUAL ACTIVE BRIDGE CONTROL CIRCUIT FOR USE WITH UNBALANCED GRID VOLTAGES

(71) Applicant: HELLA GmbH & Co. KGaA, Lippstadt (DE)

(72) Inventors: Philip Michael Johnson, Brighton, MI (US); Alan Wayne Brown, Canton, MI (US)

(73) Assignee: HELLA GmbH & Co., KGaA, Lippstadt (DE)

( * ) Notice: Subject to any disclaimer, the term of this patent is extended or adjusted under 35 U.S.C. 154(b) by 0 days.

(21) Appl. No.: 16/100,286

(22) Filed: Aug. 10, 2018

(65) Prior Publication Data

US 2019/0052182 A1 Feb. 14, 2019

Related U.S. Application Data

(60) Provisional application No. 62/544,358, filed on Aug. 11, 2017.

(51) Int. Cl.
*H02M 5/14* (2006.01)
*H02J 7/00* (2006.01)
(Continued)

(52) U.S. Cl.
CPC ............. *H02M 5/14* (2013.01); *H02J 7/0052* (2013.01); *H02M 7/217* (2013.01); *H02M 7/5387* (2013.01); *H02J 2007/0059* (2013.01)

(58) Field of Classification Search
CPC .... H02M 1/14; H02M 3/33584; H02M 7/217; H02M 7/2173; H02M 7/23;
(Continued)

(56) References Cited

U.S. PATENT DOCUMENTS

2006/0197491 A1* 9/2006 Nojima ................. H02M 7/487
318/801
2009/0102436 A1* 4/2009 Escobar Valderrama ...................
H02J 3/1857
323/207
(Continued)

FOREIGN PATENT DOCUMENTS

EP 2003758 A1 12/2008

*Primary Examiner* — Jue Zhang
*Assistant Examiner* — Kevin H Sprenger
(74) *Attorney, Agent, or Firm* — Warner Norcross + Judd LLP

(57) ABSTRACT

A control circuit for converting an unbalanced grid voltage into a DC voltage is provided. The control circuit includes a controller having a voltage detection module, a first transformation module, a level shift module, and a second transformation module. The voltage detection module provides voltage component values indicating the voltage in each phase of a three-phase AC power supply. The first transformation module converts the voltage component values from a stationary reference frame into reference voltage signals in a rotating reference frame using a Clarke-Park transform. The level shift module compensates the reference voltage signals to simulate a balanced three-phase AC voltage. The second transformation module converts the compensated reference voltage signals from the rotating reference frame to the stationary reference frame using an inverse Clarke-Park transform. The controller operates a single stage DAB converter for providing a DC charging voltage to a battery that is substantially free of fluctuations.

20 Claims, 8 Drawing Sheets

(51) Int. Cl.
*H02M 7/217* (2006.01)
*H02M 7/5387* (2007.01)

(58) Field of Classification Search
CPC ...... H02M 7/5387; H02J 7/022; H02J 7/0052; H02J 3/26; H02J 1/102; B60L 53/20; B60L 53/22; B60L 11/1812
See application file for complete search history.

(56) References Cited

U.S. PATENT DOCUMENTS

| | | | |
|---|---|---|---|
| 2009/0244937 A1 | 10/2009 | Liu | |
| 2010/0013438 A1* | 1/2010 | Anwar | B60L 58/40 320/138 |
| 2010/0091529 A1* | 4/2010 | Jakeman | H02J 1/00 363/36 |
| 2011/0134669 A1 | 6/2011 | Yuzurihara et al. | |
| 2011/0202418 A1* | 8/2011 | Kempton | B60L 53/665 705/26.1 |
| 2013/0051103 A1* | 2/2013 | Roscoe | H02M 7/53871 363/131 |
| 2013/0307486 A1 | 11/2013 | Chang | |
| 2014/0362623 A1* | 12/2014 | Farkas | H02J 3/32 363/97 |
| 2015/0130376 A1* | 5/2015 | Pace | H02P 21/0089 318/400.02 |
| 2016/0156291 A1* | 6/2016 | Becker | H02M 7/68 318/400.26 |

* cited by examiner

DUAL ACTIVE BRIDGE CONTROL CIRCUIT FOR USE WITH UNBALANCED GRID VOLTAGES

CROSS-REFERENCE TO RELATED APPLICATION

This application claims the benefit of U.S. Provisional Application 62/544,358, filed Aug. 11, 2017, the disclosure of which is hereby incorporated by reference in its entirety.

FIELD OF THE INVENTION

The present invention relates to a control circuit for use with unbalanced grid voltages when recharging vehicle batteries.

BACKGROUND OF THE INVENTION

Electric vehicles include a battery for powering an electric drive system. The battery can include multiple battery cells that are rechargeable by a DC voltage. For plug-in electric vehicles, the local electrical grid is used for recharging the battery when the vehicle is not being driven. Because most electrical grids provide a three-phase AC voltage, however, power from the local electrical grid must first be converted into a suitable DC voltage.

A variety of circuits exist for converting a three-phase AC voltage into a DC voltage. One known circuit is illustrated in FIG. 1 and includes a first stage converter and a second stage converter. The first stage converter receives a DC voltage from a front end rectifier (not shown) and outputs to a DC link capacitor, while the second stage converter provides galvanic isolation for the circuit. The first stage converter in this circuit is a dual-active-bridge (DAB) converter. In operation, its DC input is inverted by a primary-side bridge and rectified by a secondary-side bridge. The DAB converter is typically operated by a controller to regulate the magnitude of the DC output in accordance with battery charging requirements.

In some applications, it is desirable to implement a single stage design. In practice however local electrical grids can provide an unbalanced three-phase AC voltage. If not corrected, an unbalanced voltage can cause voltage distortions or current ripple in the DC output, which may be harmful to the battery during recharging. Existing single stage designs however are poorly suited for applications in which the local electrical grid is unbalanced. Accordingly, there remains a continued need for an improved single stage control circuit for recharging vehicle batteries, and in particular, a single stage control circuit including a DAB converter.

SUMMARY OF THE INVENTION

In accordance with one embodiment, a single stage DAB control circuit for converting an unbalanced grid voltage into a DC voltage is provided. The control circuit includes a controller having a voltage detection module, a first transformation module, a level shift module, and a second transformation module. The voltage detection module provides voltage component values that are indicative of the voltage in each phase of a three-phase AC power supply. The first transformation module converts the voltage component values from a stationary reference frame into reference voltage signals in a rotating reference frame using a Clarke-Park transform. The level shift module compensates the reference voltage signals to simulate an ideal, e.g., balanced, AC voltage. The second transformation module converts the compensated reference voltage signals from the rotating reference frame to the stationary reference frame using an inverse Clarke-Park transform. The controller is then operable to control operation of a single stage DAB converter on the basis of the reconstructed voltage values for providing a DC charging voltage that is substantially free of fluctuations or ripple.

In accordance with another embodiment, a method for operating a DAB circuit is provided. The method includes determining voltage component values indicative of the value of the voltage in each phase of the three-phase AC power supply and converting the voltage component values from a stationary reference frame into first and second reference voltage signals in a rotating reference frame using a Clarke-Park transform. The method then includes compensating the first and second reference voltage signals to simulate a balanced three-phase AC power supply and converting the compensated first and second reference voltage signals from the rotating reference frame to the stationary reference frame using an inverse Clarke-Park transform to provide a first power reference, a second power reference, and a third power reference. The method further includes controlling operation of a first phase dual active bridge converter, a second phase dual active bridge converter, and a third phase dual active bridge converter based on the first power reference, the second power reference, and the third power reference, respectively, for providing a DC charging voltage to the battery.

As discussed in greater detail below, the control circuit and method of operation provides a single stage design, optionally for an on-board vehicle charging system, the single stage design compensating for grid disturbances with only a marginal reduction of power factor. The DC output can be provided despite the existence of unbalanced voltage conditions in the electrical grid, and the present invention can be implemented in digital logic with effectively no additional hardware as compared to existing dual stage control circuits.

These and other features and advantages of the present invention will become apparent from the following description of the invention, when viewed in accordance with the accompanying drawings and appended claims.

DETAILED DESCRIPTION OF THE CURRENT EMBODIMENT

The embodiment disclosed herein includes a DAB control circuit and a related method of operation. The DAB control circuit is well suited for a single-stage DAB converter and compensates for grid disturbances in an AC grid voltage. As set forth below, the DAB control circuit is operable to control operation of the single-stage DAB converter on the basis of the reconstructed voltage values using a Clarke-Park transform and an inverse Clarke-Park transform. Though described herein in connection with a single-design for vehicle batteries, the DAB control circuit and related method can be used in other applications as desired.

Figure 1:
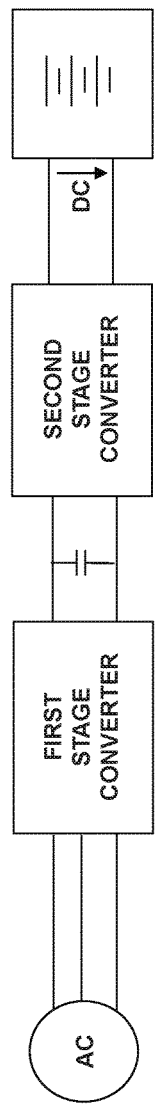
FIG. 1 is a prior art control circuit including a first stage converter and a second stage converter for charging a vehicle battery.
Figure 2:
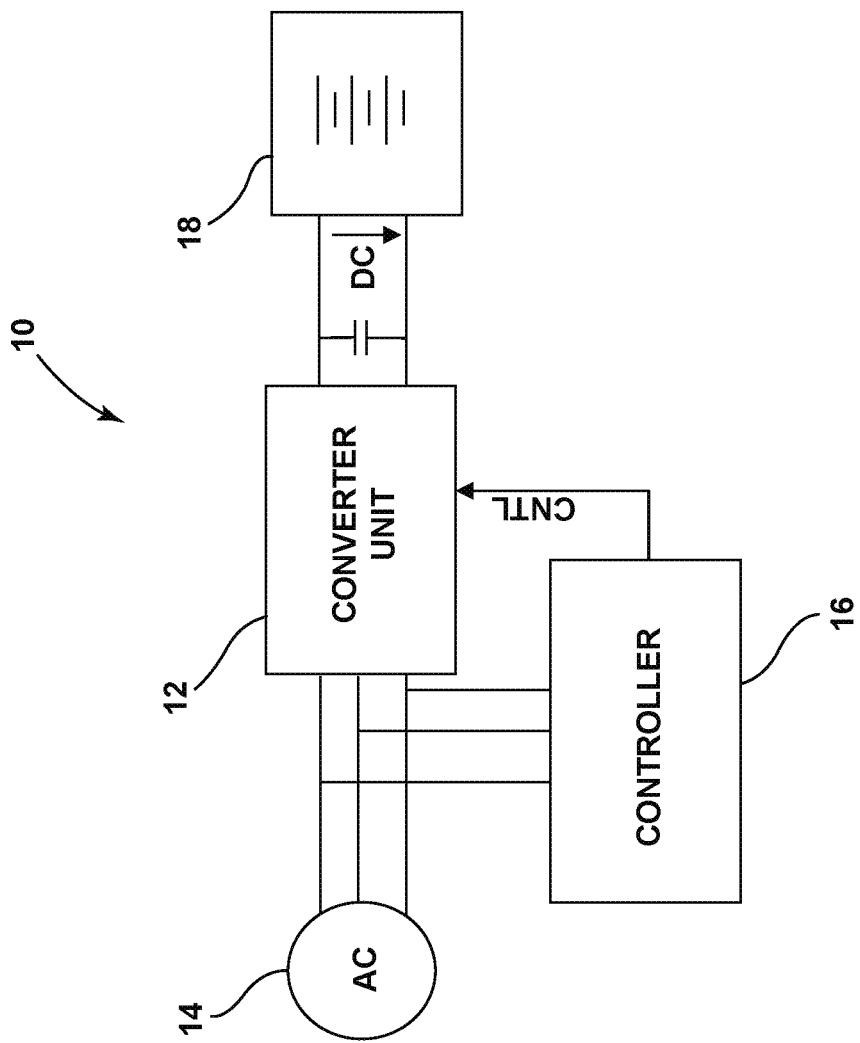
FIG. 2 is a schematic diagram of a single stage control circuit for charging a vehicle battery in accordance with an embodiment of the present invention.

Referring to FIG. 2, a single stage DAB control circuit in accordance with one embodiment is illustrated and generally designated 10. The control circuit 10 includes a converter unit 12 that is electrically coupled to a three-phase power supply 14. The control circuit 10 also includes a controller 16 for providing control signals to the converter unit 12 depending upon voltage measurements of the three-phase power supply 14. In the current embodiment, the converter unit 12 includes three DAB converters (shown in FIG. 4), each with eight controllable switches, while in other embodiments the converter unit 12 includes two DAB converters. As set forth below, the controllable switches of the DAB converters are operated by the controller 16 to provide a DC voltage to a battery 18, despite an unbalanced voltage being present in the three-phase power supply 14. In the current embodiment, the controller 16 provides pulse-width-modulated control signals (depicted as CNTL in FIG. 2) for driving the individual switches of the DAB converters, for example Si MOSFETS or HEMT switches.

Figure 3:
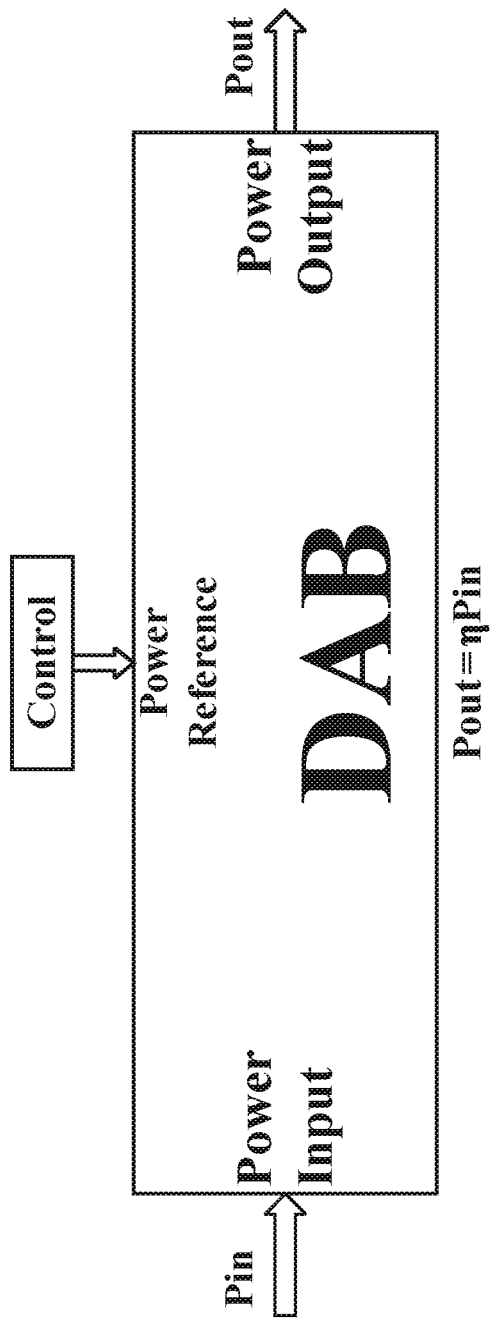
FIG. 3 is a schematic diagram of an isolated DAB in a single stage AC/DC configuration.

A single DAB converter from the converter unit 12 is shown in FIG. 3. In particular, FIG. 3 illustrates an isolated DAB topology in a single-stage AC/DC configuration. As is known in the art, the isolated DAB topology receives a time varying DC source voltage from a voltage source, for example a rectified AC grid voltage. The DC source voltage is provided to an input bridge comprising four primary side switches. The output of the input bridge is provided to the primary coil of an isolation transformer. The secondary of the isolation transformer delivers an AC output voltage to the output bridge, which comprises four secondary side switches. The resulting DC output voltage from the output bridge is provided to a load. The DAB is used both as the Power Factor Correction (PFC) stage and the DC output regulation stage, using either a matrix primary configuration or a front-end 120 Hz rectifier. This source will draw power at its input and source power at its output with some efficiency η, such that $P_{out}=\eta*P_{in}$ and controlled by a "Power Reference" command.

Figure 4:
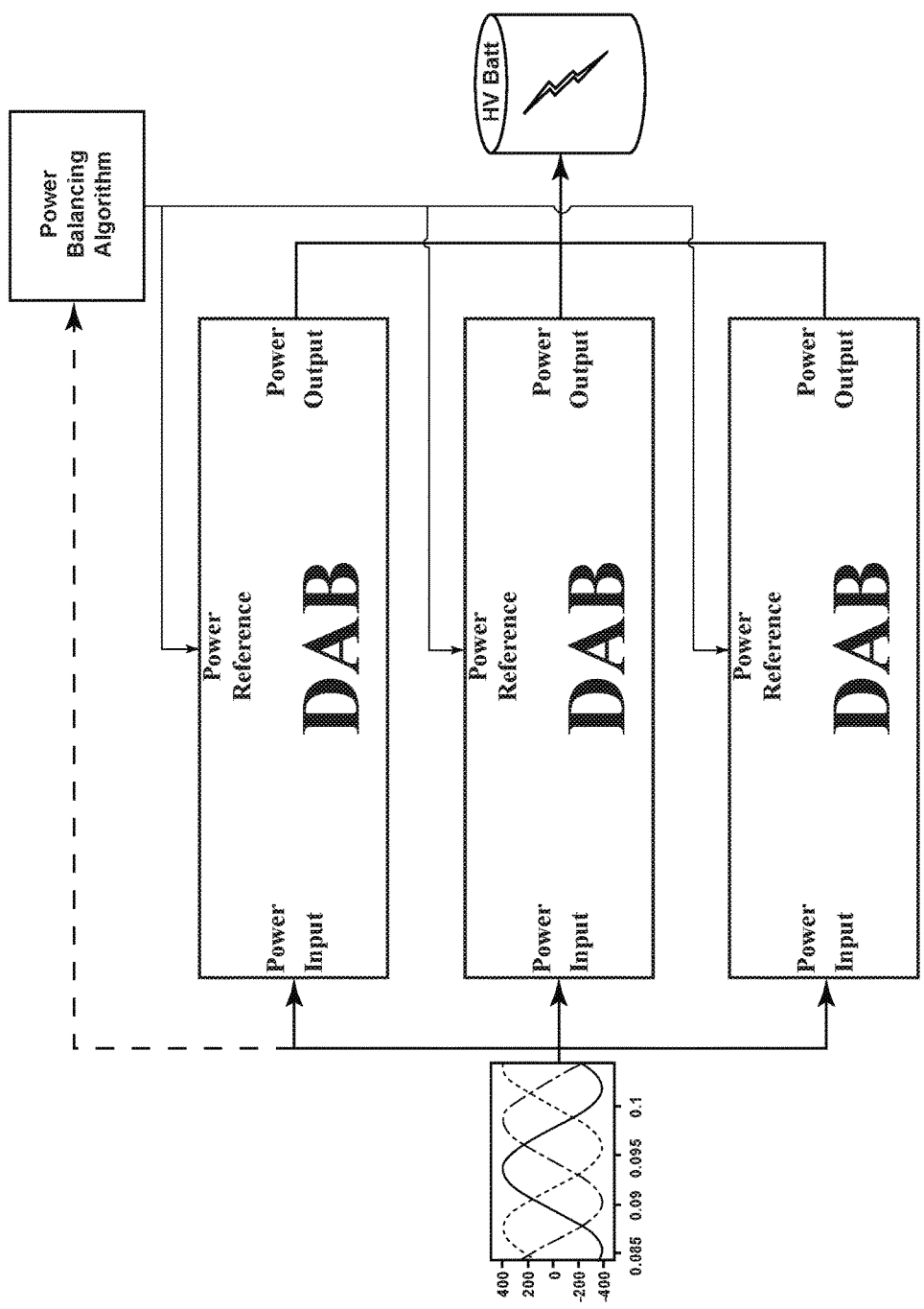
FIG. 4 is a schematic diagram of a three-phase DAB AC/DC system in a battery charging application in accordance with an embodiment of the present invention.

Three DAB stages from the converter unit 12 are shown in FIG. 4. Each DAB stage includes a three-phase AC/DC system such that one DAB is responsible for PFC of a single AC phase and DC output is achieved through the combination of all three DAB outputs. For illustrative purposes, the system shall be considered in application of charging a high-voltage (HV) battery from a three-phase $480V_{RMS}$ grid. It should, however, be noted that this is only one possible application, and the present invention can apply to any three-phase AC/DC system where a potential exists for an unbalanced three-phase source and a necessity for a DC output.

To rectify the susceptibility of the 3-phase single-stage DAB AC/DC to output ripple due to an imbalanced grid, the controller 16 dynamically adapts the power references of the DABs such that their output power is always balanced. This will necessarily come at the expense of a slightly lower grid-side power factor, but the proposed algorithm assumes that DC power output is the higher priority when the grid is already distorted.

Figure 5:
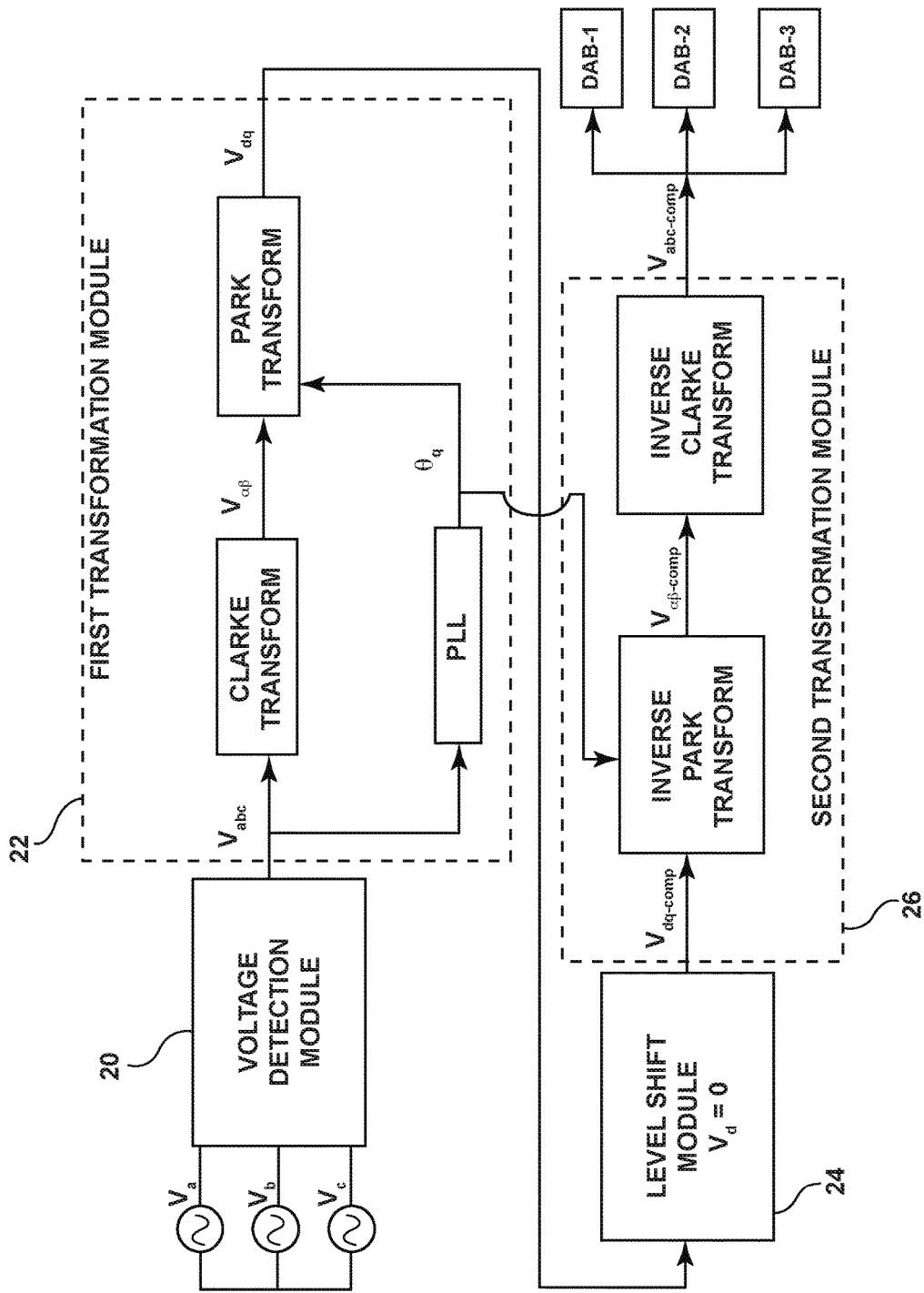
FIG. 5 is a flow chart of the control scheme used in the single stage control circuit illustrated in FIG. 2.

Referring to FIG. 5, a flow diagram illustrating operation of the controller 16 is illustrated. The flow diagram represents a number of method steps performed by the controller 16. That is, the controller 16 includes instructions that, when executed, cause the controller 16 to perform certain method steps in digital logic. These method steps are described below in connection with a voltage detection module 20, a first transformation module 22, a level shift module 24, and a second transformation module 26, each module being resident on the controller 16. Each module is discussed in turn.

The voltage detection module 20 is adapted to provide voltage component values indicative of the value of the voltage in each phase of the three-phase AC power supply 14. In particular, the voltage detection module 20 determines a first phase input voltage component ($V_a$), a second phase input voltage component ($V_b$), and a third phase input voltage component ($V_c$) based on concurrent voltage measurements of the three-phase AC power supply 14. The voltage values are output as a three-phase voltage vector ($V_a$, $V_b$, $V_c$).

The first transformation module 22 is adapted to observe the Phase-Lock-Loop (PLL) outputs from each phase and determine what grid angle most closely describes the three phases by looking for an outlier. Using the selected grid angle, the first transformation module 22 performs a Clarke-Park transformation of the 3-phase grid voltage from the stationary 3-phase (a-b-c) frame to rotating direct-quadrature (d-q) frame.

In particular, the first transformation module 22 converts the three-phase voltage vector from a stationary reference frame into first and second reference voltage signals ($V_d$, $V_q$) in a rotating reference frame. The first transformation module 22 includes a three-phase PLL algorithm, in which the three-phase voltage vector ($V_a$, $V_b$, $V_c$) is translated into a rotating reference frame using the Clarke-Park transform. The Clarke transform converts the three-phase voltage vector into two phase quantities ($V_\alpha$, $V_\beta$) in a stationary αβ coordinate system. The output of the Clarke transform is converted by a Park transform into a d-component value and a q-component value in a rotating reference frame that is defined by a grid angle Θ, with the grid angle Θ being controlled by the phase-lock-loop. Under balanced voltage conditions, the d-component value is zero ($V_d$) and the q-component value ($V_q$) depicts the voltage vector amplitude. Under unbalanced voltage conditions, the d-component value is non-zero however.

The level shift module 24 is then adapted to compensate the d-component value and the q-component value ($V_{d-comp}$, $V_{q-comp}$) such that the d-component value is zero to simulate a perfectly balanced AC voltage, with a marginal reduction in power factor. In the d-q frame, the quadrature-axis voltage $V_q$ represents the equivalent amplitude of the active grid voltages, while the direct-axis voltage $V_d$ represents the equivalent amplitude of reactive component. Thus, the required power reference depends only on $V_q$, and as such, $V_d$ shall be discarded and set to zero. In the case of a phase or amplitude distortion on the grid, a heavy 120 Hz ripple will be present on $V_q$ and higher harmonics may be incurred due to a harmonic distortion. Thus, a heavy low-pass filter (LPF) is applied to find the average value of $V_q$. Accordingly, by monitoring the output of the first transformation module 22, an unbalanced condition can be detected.

The second transformation module 26 is adapted to reconstruct voltage values in a stationary reference frame. In particular, the second transformation module 26 is adapted to convert the compensated d-component value and the compensate q-component value ($V_{d\text{-}comp}$, $V_{q\text{-}comp}$) from the rotating reference frame to the stationary reference frame using an inverse Clarke-Park transform according to the same grid angle Θ for the Clarke-Park transform.

More particularly, the second transformation module 26 uses the virtual grid values to calculate the desired input power from each DAB to achieve balanced output and DC power $P_{out}$ as $$P_{des_{phase}} = \frac{v^2_{des_{phase}}}{v^2_{rms_{phase}}} P_{out_{phase}},$$

where $v_{des_{phase}}$ is the virtual phase voltage at time t, $v_{rms_{phase}}$ is virtual grid phase RMS voltage over one period, and $P_{out_{phase}}$ is the required average output power per phase such that $P_{out_{phase}} = P_{out}/3$. The second transformation module 26 then uses the virtual grid voltage values to calculate the desired current that $P_{des_{phase}}$ would draw from $v_{des_{phase}}$ as $$i_{des_{phase}} = \frac{v_{des_{phase}}}{v^2_{rms_{phase}}} P_{out_{phase}}.$$

Two additional calculations follow. The second transformation module 26 calculates the phase power reference for the DAB using the real phase voltage as $P_{ref_{phase}} = i_{des_{phase}} * v_{grid_{phase}}$ and calculates the difference between the desired power and the power reference and multiplies by a gain of 0.5 to find the power error as $P_{err_{phase}} = \frac{1}{2}(P_{des_{phase}} - P_{ref_{phase}})$. The power error is then added to the power references of the other DABs. The second transformation module 26 can apply a zero-watt minimum saturation to the power references if reverse power flow is not permitted. Otherwise, negative power requests are expected.

As described above, the controller 16 is adapted to control operation of the converter unit 12 for providing a DC charging voltage to a battery that is substantially free of fluctuations or ripple. For this purpose, the controller 16 can include a converter control module adapted to control operation of a first phase dual active bridge converter, a second phase dual active bridge converter, and a third phase dual active bridge converter based on the output of the second transformation module 26. The DC output can be provided substantially ripple-free despite the existence of unbalanced voltage conditions in the electrical grid, with only a slight reduction in power factor, and the current embodiment can be implemented in digital logic with effectively no additional hardware.

Figure 6:
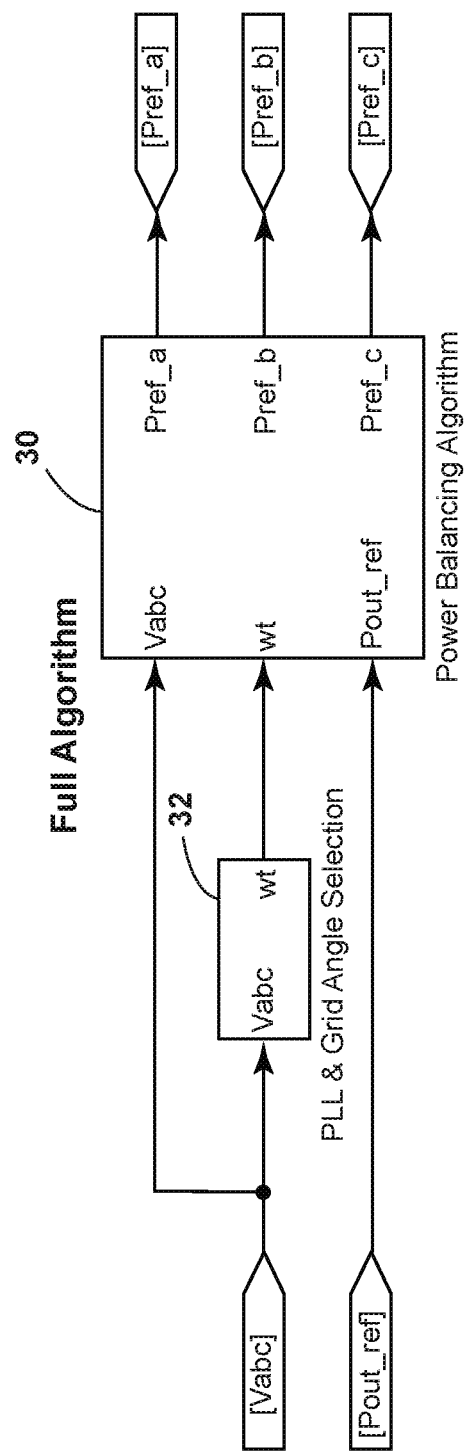
FIG. 6 depicts a DAB control algorithm in accordance with an embodiment of the present invention.
Figure 7:
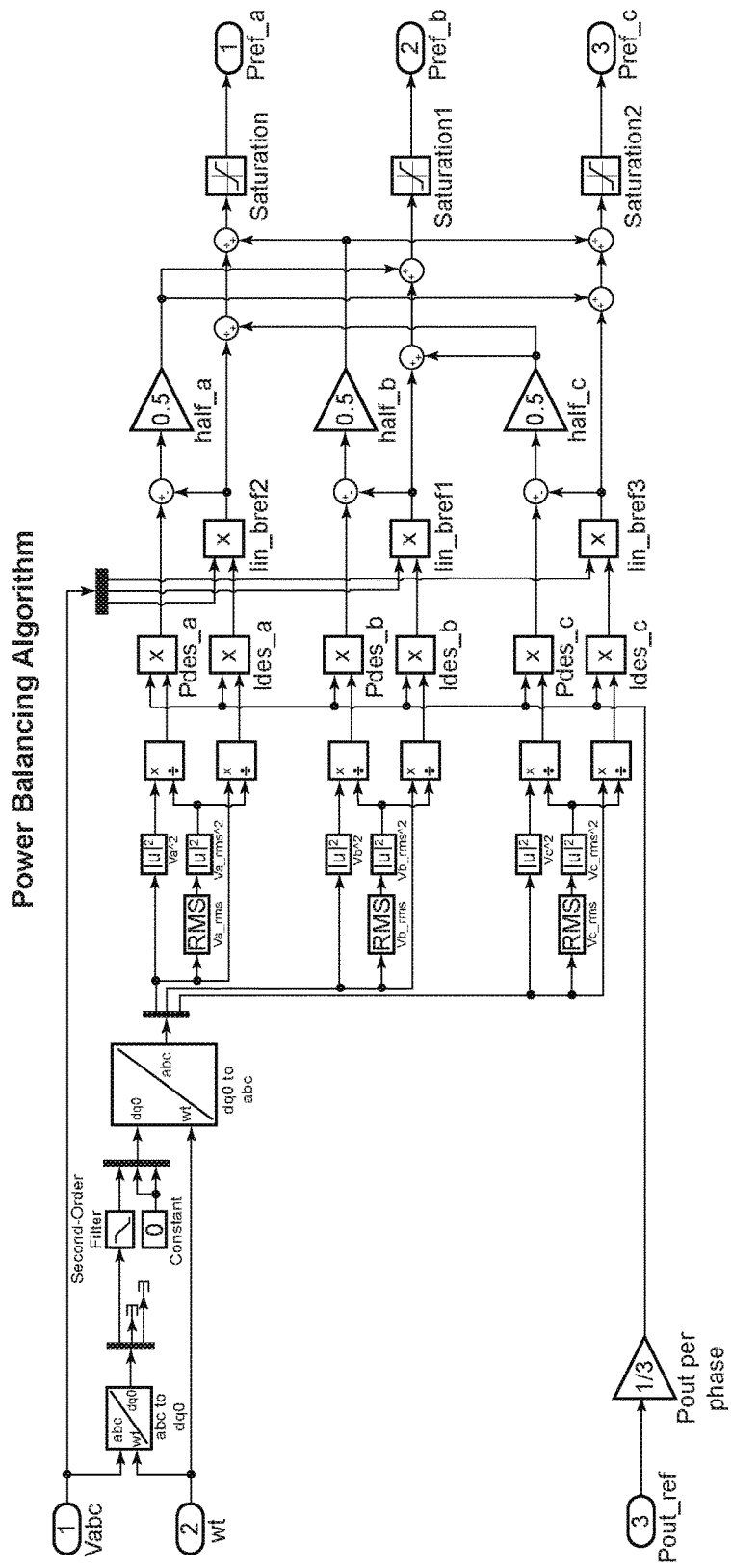
FIG. 7 depicts a power balancing algorithm in accordance with an embodiment of the present invention.
Figure 8:
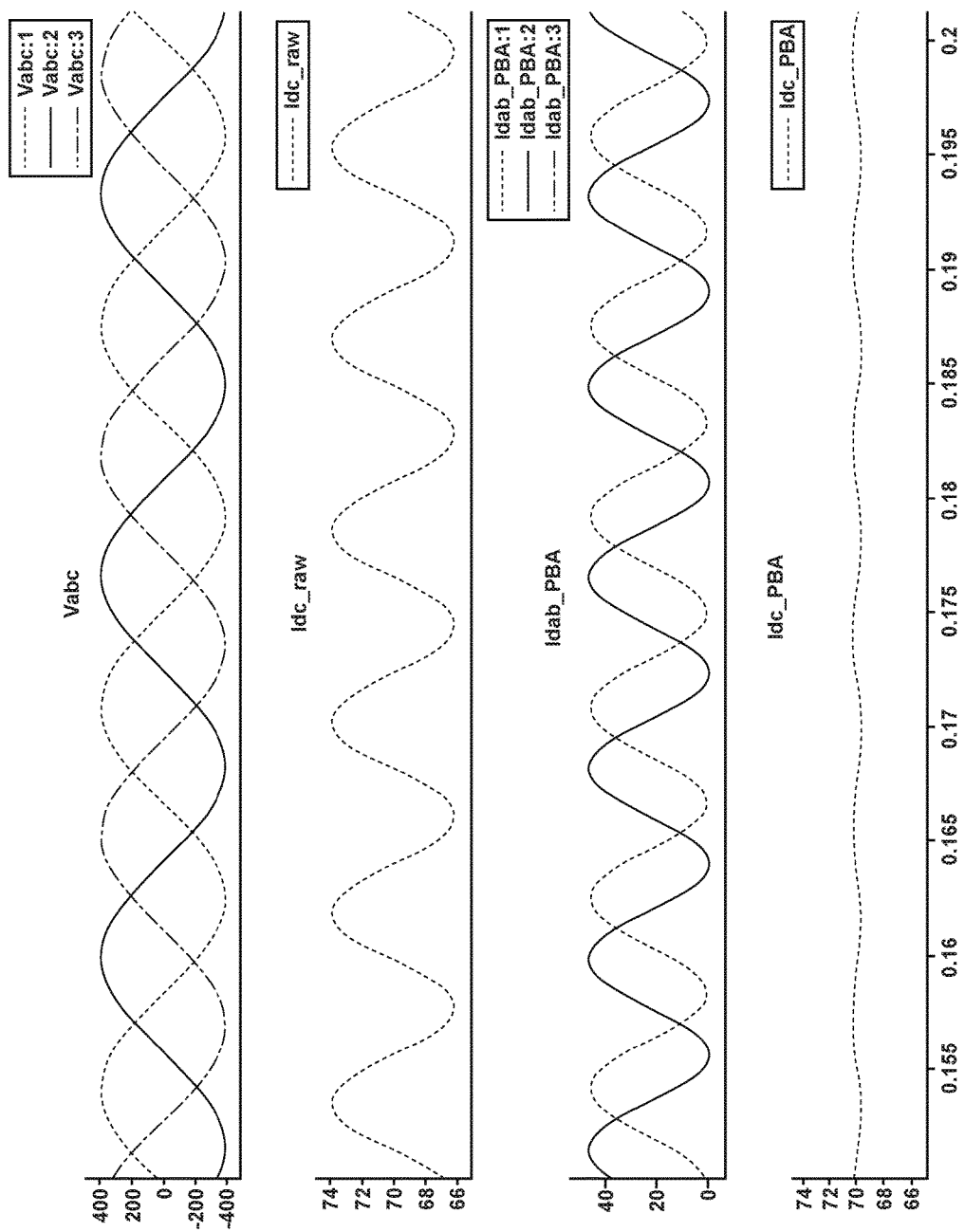
FIG. 8 are simulation results that depict the output of a 3-phase isolated DAB from an unbalanced 480V grid input to a 300V (DC) output at 7 kW per DAB reference.

A model of the forgoing control algorithm is depicted in FIGS. 6 and 7, with simulation results being shown in FIG. 8. As shown in FIG. 6, the three-phase voltage vector [Vabc] is provided to a first integrated circuit 30 (or module) for performing the phase lock loop and grid angle selection and is provided to a second integrated circuit 32 (or module) for performing the power balancing algorithm. The second integrated circuit 32 also receives, as an input, the output of the first integrated circuit 30 and the power reference [Pout_ref]. The power reference [Pout_ref] is derived by the controller 16 from an outer control architecture, which takes external commands, overlays them with operation constraints and system states, applies feedback controllers, and calculates the required output from each phase. The second integrated circuit 32 uses the virtual grid values [Vabc], [wt] and the power reference [Pout_ref] to calculate the desired input power from each DAB [Pref_a], [Pref_b], [Pref_c] to achieve a balanced output in the manner set forth above. With this information, the appropriate pulse-width-modulated gate signals are sent by a converter control module to the individually controllable switches of the DAB converter (s). A logic diagram of the power balancing algorithm performed by the second integrated circuit 32 is depicted in FIG. 7. As shown in FIG. 8, the input voltage includes a 2% phase shift distortion for a 480$V_{RMS}$ grid with a 7 kW per phase power reference and sourcing a 300$V_{DC}$ load. Without power balancing, the phase shift distortion causes an 8 A peak-to-peak ripple. With power balancing, the peak-to-peak ripple is reduced to less than 200 mA.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A control system for converting power from a three-phase AC power supply into DC power for charging a battery, the control system comprising:

a voltage detection module adapted to provide voltage component values indicative of the value of the voltage in each phase of the three-phase AC power supply in a stationary reference frame;

a first transformation module adapted to convert the voltage component values from the stationary reference frame into first and second reference voltage signals in a rotating direct-quadrature reference frame using a Clarke-Park transform, wherein a Clarke transform converts the voltage component values into phase quantities in a stationary αβ coordinate system and a Park transform converts the phase quantities into the first and second reference voltage signals in the rotating direct-quadrature reference frame, the first and second reference voltage signals having a reactive component ($V_d$) and an active component ($V_q$), respectively;

a level shift module adapted to compensate unbalance in the first and second reference voltage signals to simulate a balanced three-phase AC power supply by setting the reactive component ($V_d$) of the first and second reference voltage signals to zero and by filtering the active component ($V_q$) of the first and second reference voltage signals;

a second transformation module adapted to convert the compensated first and second reference voltage signals from the rotating direct-quadrature reference frame to the stationary reference frame using an inverse Clarke-Park transform, the second transformation module providing, as an output, a first power reference, a second power reference, and a third power reference; and a converter control module adapted to control operation of a first phase dual active bridge converter, a second phase dual active bridge converter, and a third phase dual active bridge converter based on the output of the second transformation module for providing a DC charging voltage to the battery with substantially no ripple.

2. The control system of claim 1 wherein the component voltage values are output as a three-phase voltage vector to an integrated circuit for performing a power balancing algorithm.

3. The control system of claim 2 wherein the integrated circuit includes the first transformation module, the level shift module, and the second transformation module.

4. The control system of claim 1 wherein the converter control module is adapted to control a plurality of switches of each of the first phase dual active bridge converter, the second phase dual active bridge converter, and the third phase dual active bridge converter.

5. The control system of claim 1 wherein the first phase dual active bridge converter, the second phase dual active bridge converter, and the third phase dual active bridge converter constitute a single stage converter for output to the battery.

6. The control system of claim 1 wherein the first transformation module includes a three-phase Phase Lock Loop (PLL) algorithm for the conversion of the voltage component values from the stationary reference frame into the rotating reference frame.

7. The control system of claim 1 wherein the level shift module is adapted to detect an unbalanced load condition in the three-phase AC power supply based on the output of the first transformation module.

8. The control system of claim 1 wherein the second transformation module is adapted to calculate the desired power output from each of the first phase dual active bridge converter, the second phase dual active bridge converter, and the third phase dual active bridge converter.

9. The control system of claim 1 wherein the battery is a vehicle battery and wherein the control system constitutes part of an on-board vehicle charging system.

10. The control system of claim 1 wherein the first power reference, the second power reference, and the third power reference correspond to the power output of the first phase dual active bridge converter, the second phase dual active bridge converter, and the third phase dual active bridge for a balanced load condition.

11. A method for converting power from a three-phase AC power supply into DC power for charging a battery, the method comprising:
determining voltage component values indicative of the value of the voltage in each phase of the three-phase AC power supply in a stationary reference frame;
converting the voltage component values from the stationary reference frame into first and second reference voltage signals in a rotating direct-quadrature reference frame using a Clarke-Park transform, wherein the Clarke-Park transform includes a Clarke transform to convert the voltage component values into phase quantities in a stationary αβ coordinate system and a Park transform to convert the phase quantities into the first and second reference voltage signals in the rotating direct-quadrature reference frame, the first and second reference voltage signals having a reactive component ($V_d$) and an active component ($V_q$), respectively;
compensating unbalance in the first and second reference voltage signals to simulate a balanced three-phase AC power supply by setting the reactive component ($V_d$) of the first and second reference voltage signals to zero and by filtering the active component ($V_q$) of the first and second reference voltage signals;
converting the compensated first and second reference voltage signals from the rotating direct-quadrature reference frame to the stationary reference frame using an inverse Clarke-Park transform to provide a first power reference, a second power reference, and a third power reference; and
controlling operation of a first phase dual active bridge converter, a second phase dual active bridge converter, and a third phase dual active bridge converter based on the first power reference, the second power reference, and the third power reference for providing a DC charging voltage to the battery with substantially no ripple.

12. The method of claim 11 wherein the controlling step includes controlling a plurality of switches of each of the first phase dual active bridge converter, the second phase dual active bridge converter, and the third phase dual active bridge converter.

13. The method of claim 11 wherein the first phase dual active bridge converter, the second phase dual active bridge converter, and the third phase dual active bridge converter constitute a single stage converter for output to the battery.

14. The method of claim 11 wherein converting the voltage component values from a stationary reference frame in the rotating reference frame includes performing a three-phase Phase Lock Loop (PLL) algorithm.

15. The method of claim 11 wherein converting the compensated first and second reference voltage signals includes detecting an unbalanced load condition in the three-phase AC power supply.

16. The method of claim 11 further including calculating the desired power output from each of the first phase dual active bridge converter, the second phase dual active bridge converter, and the third phase dual active bridge converter.

17. A controller for controlling a single stage converter for charging a vehicle battery, the single stage converter including a first phase dual active bridge (DAB), a second phase DAB, and a third phase DAB, the controller comprising:
a voltage detection module adapted to provide voltage component values indicative of the value of the voltage in each phase of a three-phase AC power supply in a stationary reference frame;
a first transformation module and adapted to convert the voltage component values from the stationary reference frame into first and second reference voltage signals in a rotating direct-quadrature reference frame using a Clarke-Park transform, wherein a Clarke transform converts the voltage component values into phase quantities in a stationary αβ coordinate system and a Park transform converts the phase quantities into the first and second reference voltage signals in the rotating direct-quadrature reference frame, the first and second reference voltage signals having a reactive component ($V_d$) and an active component ($V_q$), respectively;
a level shift module adapted to compensate unbalance in the first and second reference voltage signals to simulate a balanced three-phase AC power supply by setting the reactive component ($V_d$) of the first and second reference voltage signals to zero and by filtering the active component ($V_q$) of the first and second reference voltage signals;
a second transformation module adapted to convert the compensated first and second reference voltage signals from the rotating direct-quadrature reference frame to the stationary reference frame, the second transformation module providing, as an output, a first power reference, a second power reference, and a third power reference; and a converter control module adapted to control operation of the first phase DAB, the second phase DAB, and the third phase DAB based on the output of the second transformation module for providing a DC charging voltage to the vehicle battery with substantially no ripple.

18. The controller of claim 17, wherein the first power reference, the second power reference, and the third power reference correspond to the desired power output of the first phase DAB, the second phase DAB, and the third phase DAB, respectively, for a balanced load condition.

19. The controller of claim 17 wherein the component voltage values are output as a three-phase voltage vector.

20. The controller of claim 17 wherein the controller is adapted to control a plurality of switches of each of the first phase DAB, the second phase DAB, and the third phase DAB.

* * * * *